(12) United States Patent
Merritt (10) Patent No.: US 11,002,894 B1
(45) Date of Patent: May 11, 2021

(54) LASER COMMUNICATION NETWORK IMPLEMENTED WITH MULTI-CHROIC FILTERS

(71) Applicant: United States of America as represented by the Administrator of NASA, Washington, DC (US)

(72) Inventor: Scott Merritt, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/568,626

(22) Filed: Sep. 12, 2019

(51) Int. Cl.
| | |
|---|---|
| *G02B 5/20* | (2006.01) |
| *H04B 10/50* | (2013.01) |
| *H04B 10/118* | (2013.01) |
| *G02B 5/28* | (2006.01) |
| *H04B 7/185* | (2006.01) |
| *G02B 6/02* | (2006.01) |

(52) U.S. Cl.
CPC ............ *G02B 5/201* (2013.01); *G02B 5/284* (2013.01); *G02B 6/02076* (2013.01); *H04B 7/18515* (2013.01); *H04B 10/118* (2013.01); *H04B 10/503* (2013.01); *H04B 10/506* (2013.01)

(58) Field of Classification Search
CPC .... G02B 5/201; G02B 5/284; G02B 6/02076; H04B 10/503; H04B 10/118; H04B 7/18515; H04B 10/506
USPC .......................................................... 398/182
See application file for complete search history.

(56) References Cited

U.S. PATENT DOCUMENTS

| | | | | |
|---|---|---|---|---|
| 6,327,063 B1* | 12/2001 | Rockwell | ............. | H04B 10/118 398/122 |
| 6,493,878 B1* | 12/2002 | Kassatly | .................. | H04N 7/15 725/144 |
| 7,242,478 B1* | 7/2007 | Dombrowski | ............ | G01J 3/02 356/419 |
| 7,433,042 B1* | 10/2008 | Cavanaugh | ............... | G01J 3/02 356/419 |
| 8,577,183 B2* | 11/2013 | Robinson | ................ | G01S 17/90 382/299 |
| 9,157,801 B2* | 10/2015 | Dottery | ...................... | G01J 3/44 |
| 9,239,262 B2* | 1/2016 | Rapoport | ................ | G01J 3/427 |
| 9,528,687 B1* | 12/2016 | Kress | ................. | H04B 7/18504 |
| 9,971,095 B2* | 5/2018 | Kim | ................... | G02B 6/29361 |
| 10,627,576 B2* | 4/2020 | Kim | ...................... | G02B 27/141 |
| 2003/0122954 A1* | 7/2003 | Kassatly | .................. | H04N 7/08 348/335 |

(Continued)

*Primary Examiner* — Abbas H Alagheband
(74) *Attorney, Agent, or Firm* — Christopher O. Edwards; Bryan A. Geurts; Helen M. Galus (57) ABSTRACT

A laser communication network implemented with multi-chroic filters that are able to partition signals from a band of wavelengths into different sub-bands that enable more than one relay terminal to interconnect users (i.e., sources and sinks of traffic) is provided. A band of wavelengths may be partitioned to enable users to communicate with relay satellites, and relay satellites to communicate with one another, using a predefined set of transmission and reception wavelengths regardless of which particular relay is in the communication session. In other words, embodiments support both relay satellites and user satellites by constructing distinct passbands for relay-borne terminals and the same passbands for users.

17 Claims, 8 Drawing Sheets

(56) References Cited

U.S. PATENT DOCUMENTS

| | | | |
|---|---|---|---|
| 2007/0264586 A1* | 11/2007 | Wu | G02B 5/22 |
| | | | 430/7 |
| 2013/0015369 A1* | 1/2013 | Rapoport | G01J 3/427 |
| | | | 250/459.1 |
| 2015/0244458 A1* | 8/2015 | Erkmen | H04B 7/18504 |
| | | | 398/122 |
| 2016/0204866 A1* | 7/2016 | Boroson | H04J 14/02 |
| | | | 398/97 |
| 2016/0291332 A1* | 10/2016 | Moore | G02B 27/141 |
| 2017/0207597 A1* | 7/2017 | Regelskis | H01S 3/06791 |
| 2018/0172915 A1* | 6/2018 | Kim | G02B 6/29395 |
| 2018/0270010 A1* | 9/2018 | Troeltzsch | H04J 14/0208 |

* cited by examiner

LASER COMMUNICATION NETWORK IMPLEMENTED WITH MULTI-CHROIC FILTERS

STATEMENT OF FEDERAL RIGHTS

The invention described herein was made by an employee of the United States Government and may be manufactured and used by or for the Government for Government purposes without the payment of any royalties thereon or therefore.

FIELD

The present invention generally relates to communications, and more specifically, to a laser communication network implemented with multi-chroic filters.

BACKGROUND

Relay satellites and user satellites need to deconflict their use of wavelengths for laser communications. Not only must relay satellites communicate with users in a user band, but they also must communicate with each other at wavebands distinct from the user band. Relay satellites, which are not the sources or sinks of substantial network traffic, may host different types of terminals that use different wavebands, such as Type A terminals and Type B terminals.

By definition, a relay must include more than one terminal. For example, a relay may include one Type A terminal and one Type B terminal, two Type A terminals and one Type B terminal, one Type B terminal and two Type A terminals, two of each type of terminal, or more than two of either or both Type A terminals and Type B terminals. One may regard a relay-type as a relay having a number and mix of terminals. These include the terminal mixes listed above.

By definition, a Type A terminal can transmit a laser communications signal to be received at a Type B terminal at a wavelength in a first waveband. Similarly, a Type B terminal can transmit to a Type A terminal at a wavelength in a second waveband distinct from the first waveband. Each terminal type uses a separate transmit and receive waveband. Thus, in monostatic terminal designs (i.e., those that use a single telescope or optical module to both transmit and receive optical signals), the higher power transmit signals are readily distinguished from lower power received signals.

User terminals, which are the sources or sinks of substantial network traffic, must be able to communicate with either a Type A terminal or a Type B terminal. Therefore, user terminals cannot themselves be a Type A terminal or a Type B terminal. A user waveband distinct from the first and second wavebands is necessary to include data sources and sinks. Prior networks avoid this wavelength conflict either by operating point-to-point (i.e., without relays, and therefore, not really a network) or by not including more than one relay. Accordingly, an improved technique for performing waveband de-confliction in multi-relay free space optical networks may be beneficial.

SUMMARY

Certain embodiments of the present invention may provide solutions to the problems and needs in the art that have not yet been fully identified, appreciated, or solved by conventional communications technologies. For example, some embodiments pertain to a laser communication network implemented with multi-chroic filters. Such embodiments may add a user waveband that de-conflicts the wavelength plan and enables relay-able traffic (i.e., traffic flowing through one or more relays) from source to sink. Per the above, this is not done in existing systems, which operate point-to-point or only with a single multi-terminal relay.

In an embodiment, a system includes at least one user device including a user terminal with a multi-chroic filter. The user terminal includes a user transmit filter and a user receive filter. The system also includes two or more relays. Each relay includes at least two terminals having different types from one another, as well as from the user terminal. Each relay terminal includes a relay transmit filter and a relay receive filter. The multi-chroic filters are configured to partition signals from bands of a wavelength into a plurality of sub-bands using a predefined set of transmission and receiving wavelengths.

In another embodiment, a relay includes a first terminal of a first type that includes a first multi-chroic filter. The relay also includes a second terminal of a second type that includes a multi-chroic filter. The multi-chroic filters of the first terminal and the second terminal are configured to partition signals from bands of a wavelength into a plurality of sub-bands using a predefined set of transmission and receiving wavelengths.

In yet another embodiment, a relay includes a Type A terminal that includes a first multi-chroic filter. The relay also includes a Type B terminal that includes a multi-chroic filter. The multi-chroic filters of the Type A terminal and the Type B terminal are configured to partition signals from bands of a wavelength into a plurality of sub-bands using a predefined set of transmission and receiving wavelengths.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to a laser communication network implemented with multi-chroic filters that are able to partition signals from bands of wavelengths into different sub-bands that enable more than one relay terminal (e.g., a set of series-coupled relays) to interconnect users (i.e., sources and sinks of traffic). Indeed, a band of wavelengths may be partitioned to enable users to communicate with relay satellites, and relay satellites to communicate with one another, using a predefined set of transmission and reception wavelengths regardless of which particular relay is in the communication session. In other words, embodiments support both relay satellites and user satellites by constructing distinct passbands for relay-borne terminals in the same passbands for users.

"Multi-chroic" is a neologism for a set of network-enabling filters having specific waveband-allocation properties. This term is used herein to distinguish some embodiments from dichroic filters, which separate light into a one lowpass band and one highpass band (i.e., two wavebands, with one being a stopband and the other being a passband). Dichroic filters are commonly used. However, the use of multi-chroic filters allows for multiple passbands and multiple stopbands (e.g., at least two passbands and/or at least two stopbands for Type A terminals and Type B terminals, as in the embodiment of FIGS. 3A and 3B). In some embodiments, the multi-chroic filters may include one or more dichroic filters. The user filter in FIGS. 3A and 3B can be a bandstop filter or a dichroic filter, for example. However, it is not proper to describe the whole set of filters as dichroic even if one filter is dichroic.

It should be noted that while two types of terminals and their corresponding wavebands, i.e., Type "A" and Type "B," are described herein, additional terminal types, relay types, and passbands may be accommodated without deviating from the scope of the invention. It should also be noted that while satellite systems are discussed herein, non-satellite users may be included in some embodiments. For instance, high speed relay networks in some embodiments may include airborne users, shipborne users, users in areas that are under-served by other broadband technologies, deep space probes, rovers, communication devices on the moon, other planets, or other bodies than the Earth, or any other suitable land, sea (whether on the surface or underwater), air, or space-based users without deviating from the scope of the invention. Indeed, some embodiments offer a mechanism to extend planetary networks beyond terrestrial and undersea networks.

Some embodiments use Consultative Committee for Space Data Systems (CCSDS) Orange Book-compatible waveband assignments. Referring to the Center Frequency Specification in section 4.1.1 thereof, the center frequency of the optical carrier shall be $191.6 + n \times 0.1$ THz, where n is an integer ranging from 0 to 33. It should be noted that these center frequencies in the optical C-band are a subset of those defined in the ITU-T G.694.1 frequency grid with 100 GHz channel spacing. The frequencies range from 191.6 THz to 194.9 THz and correspond to wavelengths in vacuum ranging from 1538.19 nm to 1564.68 nm. Center frequencies between 191.6 THz and 193.2 THz, inclusive, (i.e., n=0 to 16) are designated as Data Communications Band A and shall be used in this specification by transmitters in Type A terminals. Center frequencies between 193.3 THz and 194.9 THz, inclusive, (n=17 to 33) are designated as Data Communications Band B and shall be used in this specification by transmitters in Type B terminals. However, it should be noted that any suitable center frequency specifications may be used without deviating from the scope of the invention.

In some embodiments, N bands are at a given wavelength. For instance, consider the scenario with four bands 1, 2, 3, and 4. Transmission from a Type A terminal to a Type B terminal (either or both of which may be a geosynchronous relay satellite) is at a center wavelength of $\lambda_1$. Transmission from a Type B terminal to a Type A terminal is at a center wavelength of $\lambda_2$. Transmission from either a Type A terminal or a Type B terminal to a user terminal is at center wavelength of $\lambda_3$. Transmission from a user terminal to either a Type A terminal or a Type B terminal is at center wavelength of $\lambda_4$. All four wavelengths are distinct, and are part of distinct wavebands.

In order to facilitate communications, filters of optical modules (e.g., telescopes with embedded filtering, signal routing, and related capabilities in laser communication systems) for each terminal are optically coated for the same passbands for users and for complementary passbands for Type A versus Type B terminals, as shown in FIGS. 3A, 3B, 4A, and 4B, for example. The coatings may be or include hafnium oxide(s), tantalum oxide(s), silicon dioxide, or any combination thereof in any number of layers without deviating from the scope of the invention. Indeed, in some embodiments, more than 100 layers may be used in an optical coating, as is frequently the case for coarse wavelength division multiplexing (CWDM) applications. However, CWDM is typically used in fiber optic networks, and not in free-space networks. Some nonlimiting examples of coating vendors include, but are not limited to, REO™, CVI Laser Optics™, and Andover Corporation™.

In embodiments where the terminal includes an interferometer, a Fabry-Perot (FP) etalon may be used for optical communications. An FP etalon is the simplest form of FP interferometer. Its primary optical property is that if a monochromatic light ray travels back and forth between two mirrors and the back-and-forth optical distance between the mirrors equals an integral number of wavelengths ($\lambda$, $2\lambda$, $3\lambda$, etc.), then the light passes through the etalon. A given etalon coating layer may have a thickness of between 157 nm to 3 μm in some embodiments. An etalon is typically one of the following: (1) two very flat, very parallel mirrors (planar etalon—most are of this type); or (2) two identical spherical mirrors with their concave sides facing each other and with the distance between the mirrors equal to each mirror's radius of curvature (confocal or spherical etalon).

A multi-chroic filter set may be implemented in some embodiments with optical coatings, fiber Bragg gratings (FBGs), prisms, other wavelength-selective components, or any combination thereof. Optical coatings may be applied by e-beam evaporation, which directs an electron beam at one or more crucibles containing the desired coating materials (e.g., silicon dioxide, titanium dioxide, silicon, hafnium oxide, etc.). In certain embodiments, other coating deposition or growth techniques may be employed, such as chemical vapor deposition, plating, etc.

Optical coatings in some embodiments may include sophisticated layer structures of aggregates of sub-filter units (e.g., multi-layer etalons) and spacer layers. Spacer layers need not be of the same thickness or material composition in some embodiments. For coatings, the slope of the filter skirts or passband/stopband edge slopes and shape are a function of the total number and type(s) of the coating layers, well as the number and type(s) of spacer layers, coating film density, and other design choice and process variables. By way of nonlimiting example, a filter in the multi-chroic filter set may have a coating that includes 10 etalons and 11 spacer layers. For FBGs, one may program the desired filter characteristics into the fiber by exposing the fiber to an intense beam pattern using a short wavelength laser.

Figure 1:
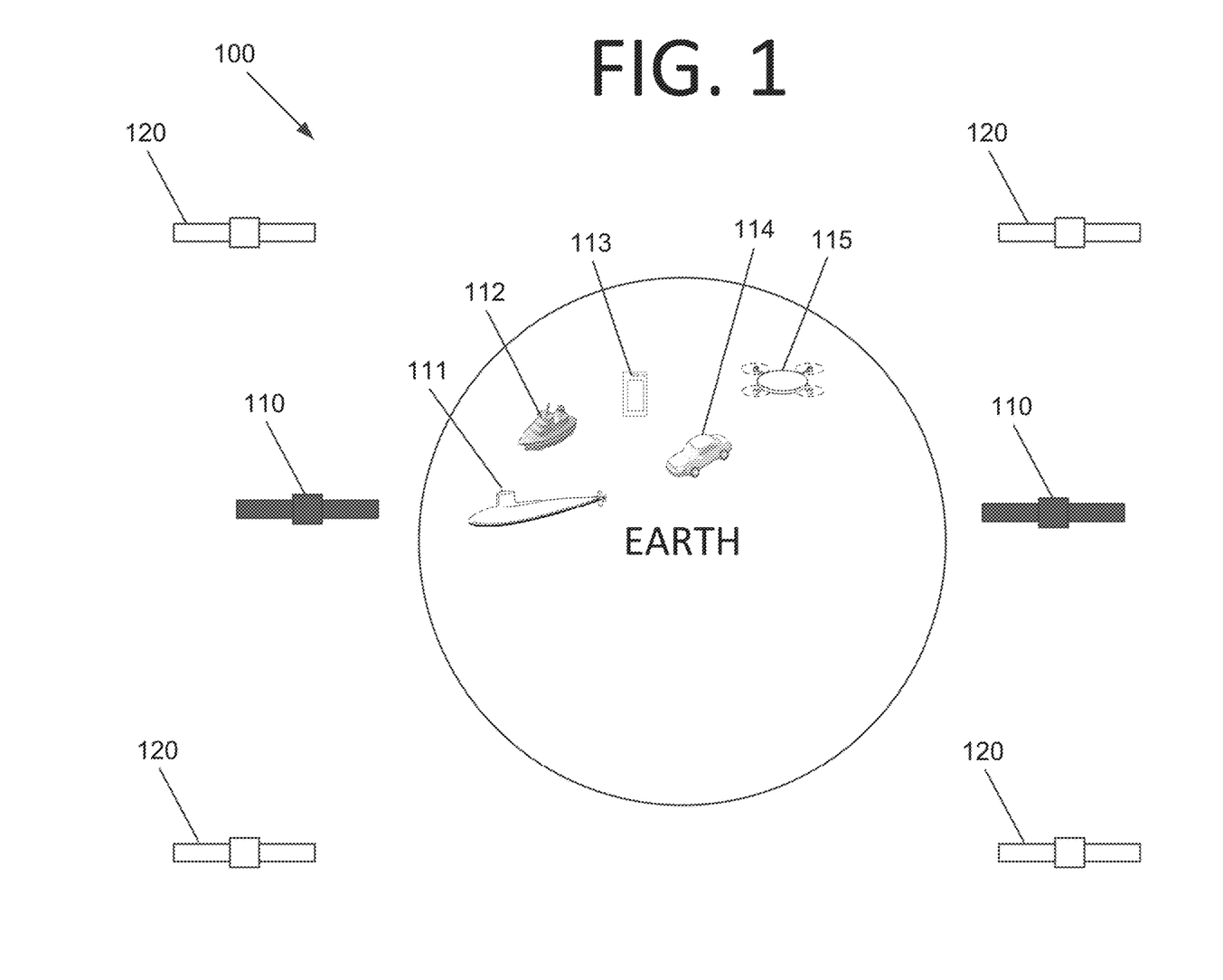
FIG. 1 illustrates a satellite network that includes both Type A and Type B terminals on multiple relays, as well as multiple user terminals, according to an embodiment of the present invention.

FIG. 1 illustrates a satellite network 100 that includes both Type A and Type B terminals on multiple relays and multiple users having at least one respective terminal, according to an embodiment of the present invention. Network 100 includes satellites 110, submarines 111, ships 112, computing devices 113, vehicles 114, and drones 115 as users. These users may communicate with relays 120, which each have Type A and Type B terminals, per the above. Relays 120 may be used to transport communications from a user terminal via one or more relays 120, for example. For instance, satellites 110, submarines 111, ships 112, computing devices 113, vehicles 114, and drones 115 may be a user terminal. It should be appreciated that any desired number and types of terminals may be used by the relays in some embodiments without deviating from the scope of the invention.

Figure 2:
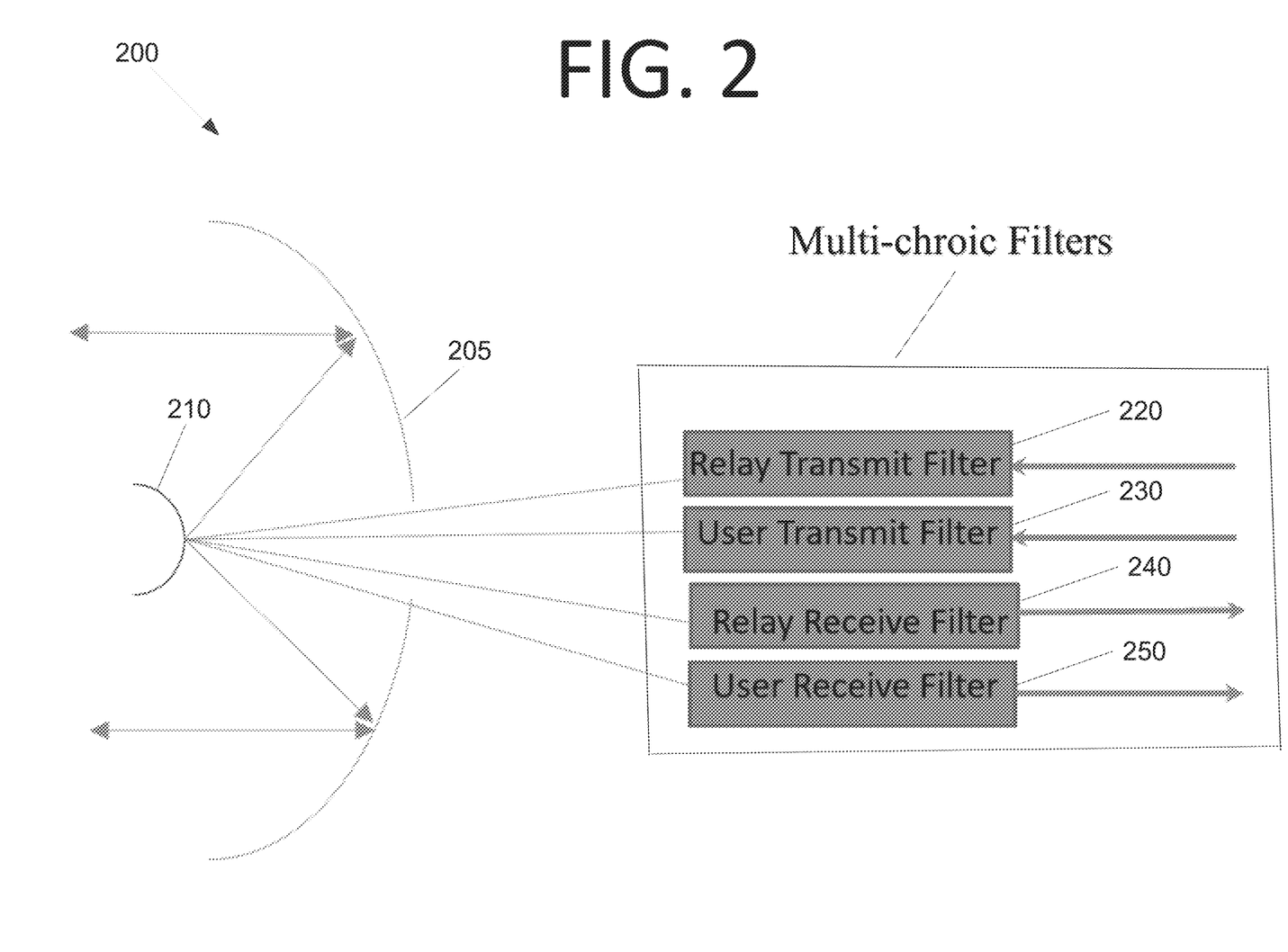
FIG. 2 illustrates multi-chroic filters in an optical module, according to an embodiment of the present invention.

FIG. 2 illustrates multi-chroic filters in an optical module 200, according to an embodiment of the present invention. Optical module 200 includes a primary mirror 205 and a secondary mirror 210 that is configured to focus light that is sent by/received from optical module 200. Optical module 200 also includes a relay transmit filter 220, a user transmit filter 230, a relay receive filter 240, and a user receive filter 250. Filters 220, 230 filter light transmitted by mirrors 205, 210 and filters 240, 250 filter light received by optical module 200.

Figure 3A:
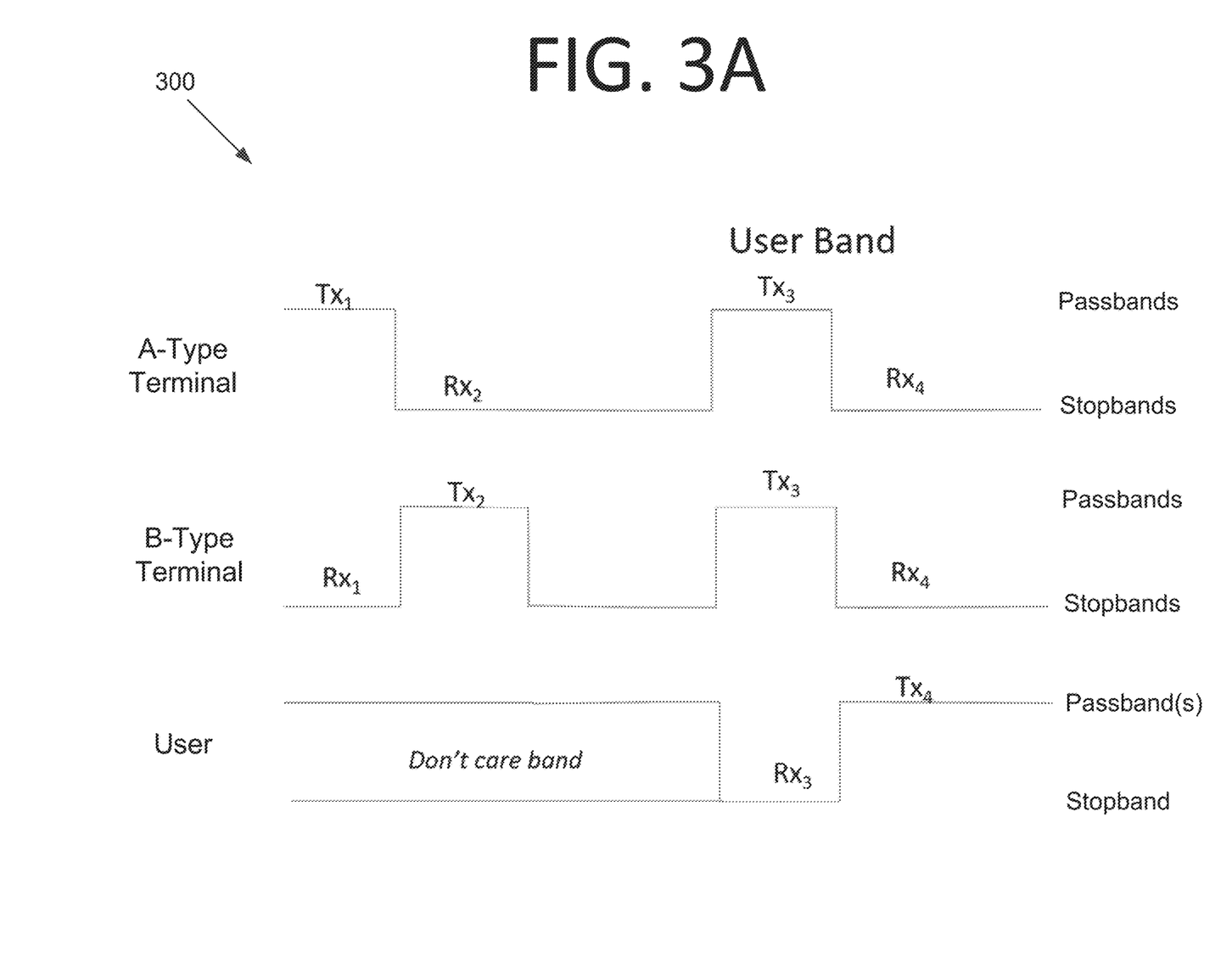
FIG. 3A illustrates a transmit subset of a communication scheme implemented in a laser communication network with multi-chroic filters, according to an embodiment of the present invention.
Figure 3B:
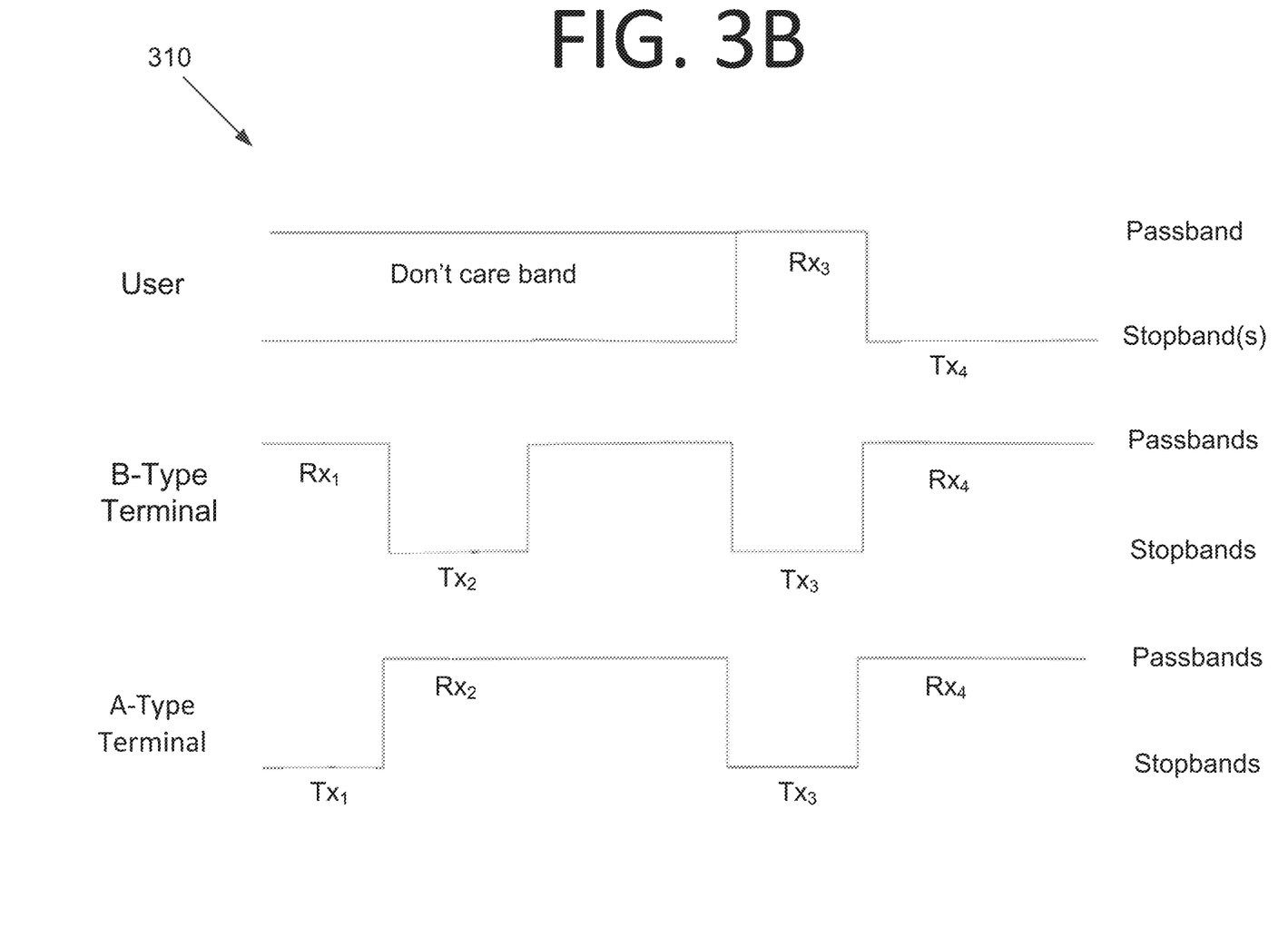
FIG. 3B illustrates a receive subset of the communication scheme, according to an embodiment of the present invention.

FIGS. 3A and 3B illustrate a transmit subset 300 and a receive subset 310 of a communication scheme implemented in a laser communication network with multi-chroic filters, according to an embodiment of the present invention. The transmission (Tx) path filters are shown in FIG. 3A. The receive (Rx) path filters are shown in FIG. 3B and have the opposite stopband/passband characteristics (e.g., from coatings, the wavelength-selective pattern of an FBG, or other wavelength-selective elements). In FIGS. 3A and 3B, the Type A terminal transmits to the Type B terminal on band $Tx_1$ and transmits to the user on band $Tx_3$. The Type A terminal also receives from the Type B terminal on band $Rx_2$ and receives from the user on band $Rx_4$.

Like the Type A terminal, the Type B terminal transmits to and receives from the user on bands $Tx_3$ and $Rx_4$, respectively. However, the Type B terminal transmits to the Type A terminal on band $Tx_2$ and receives from the Type A terminal on band $Rx_1$. The user does not care about bands 1 and 2 since these are for relay communications. However, the user transmits to both types of terminals on band $Tx_4$ and receives from both types of terminals on band $Rx_3$.

Figure 4A:
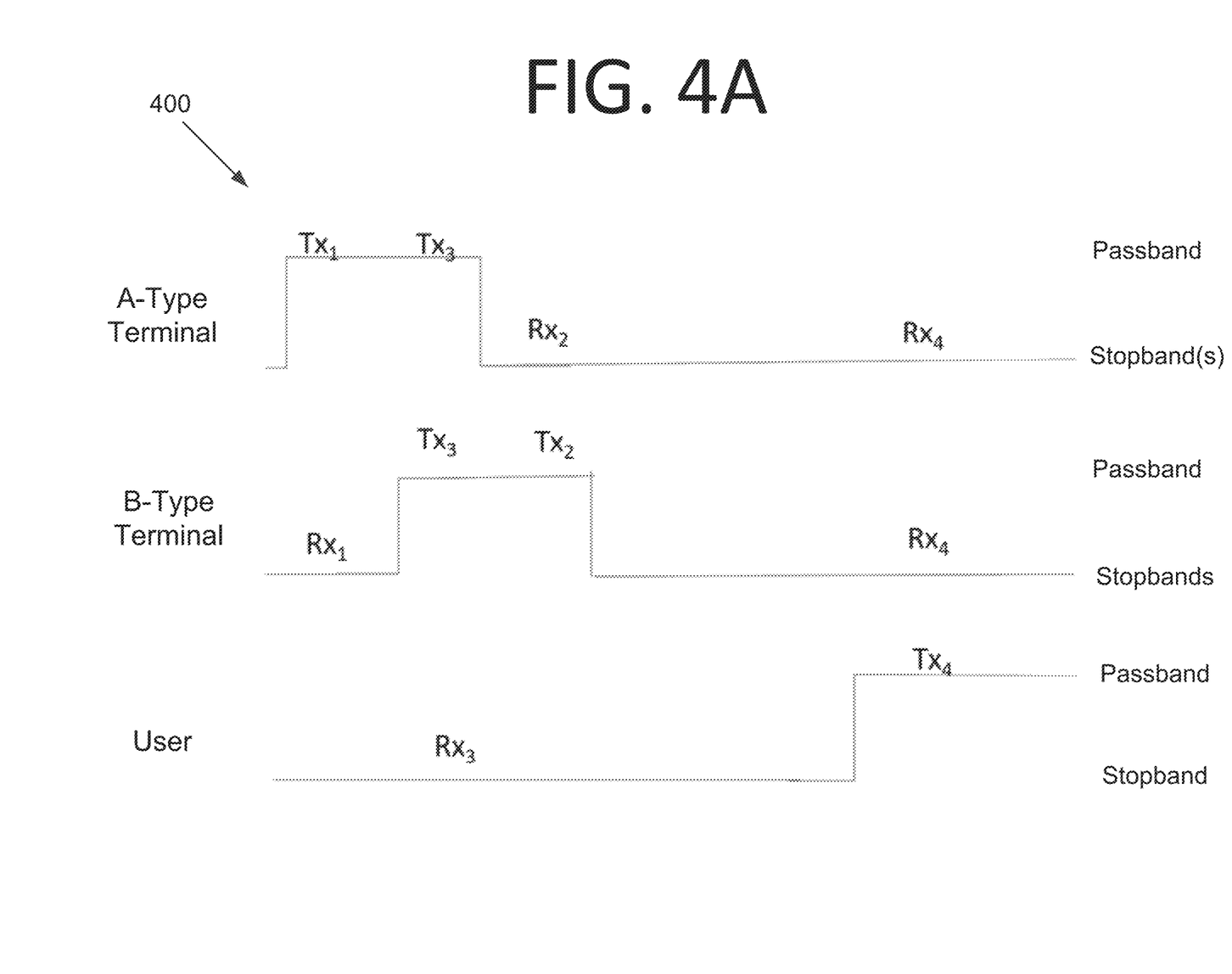
FIG. 4A illustrates a transmit subset of another communication scheme implemented in a laser communication network with multi-chroic filters, according to an embodiment of the present invention.
Figure 4B:
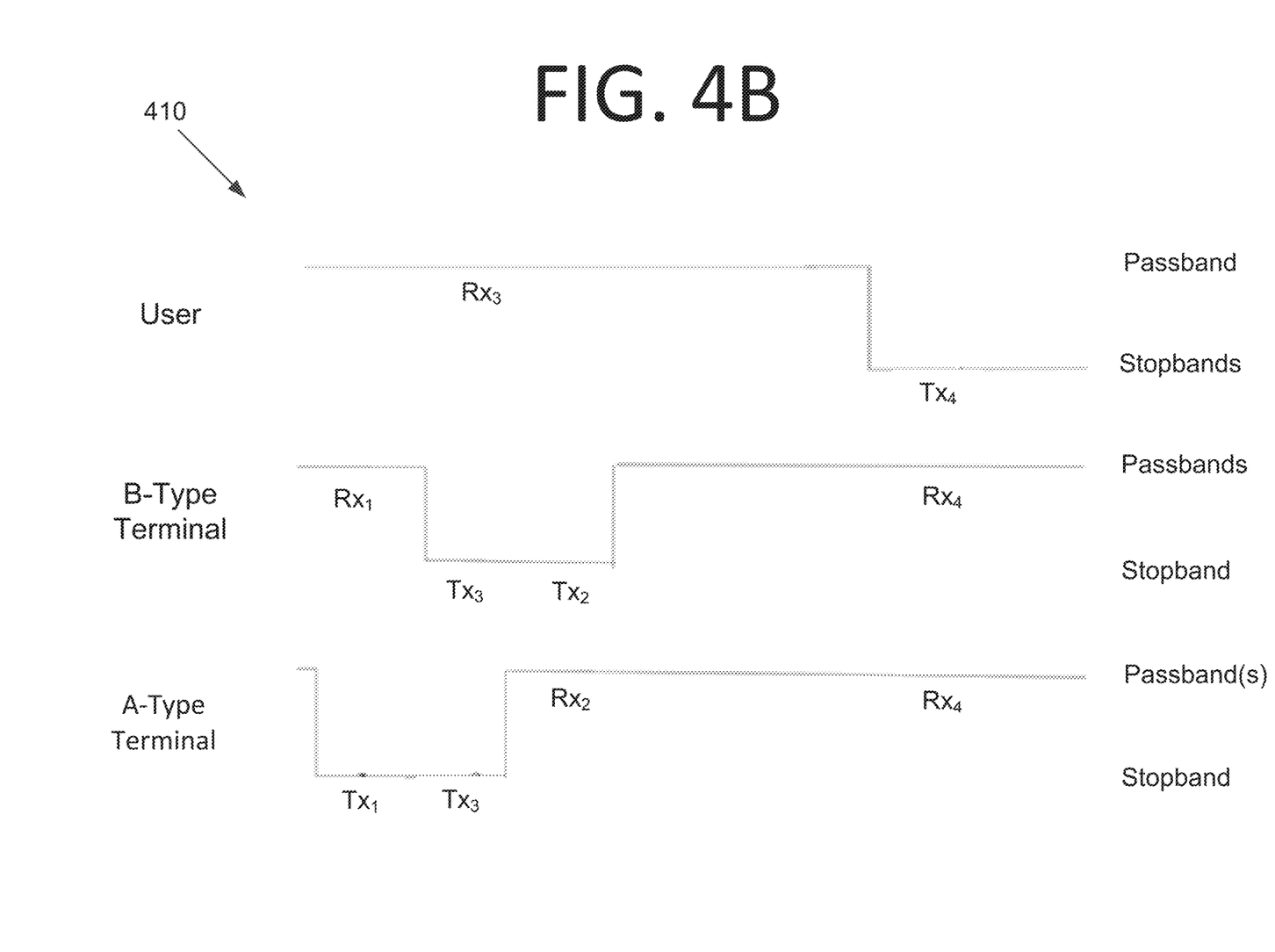
FIG. 4B illustrates a receive subset of the communication scheme, according to an embodiment of the present invention.

In an alternative scheme, bands 3 and 2 may be swapped. Such a scheme is shown in FIGS. 4A and 4B, which illustrate a transmit subset 400 and a receive subset 410 thereof. This scheme corresponds with D2 of Table I and design #35 of Table II. These designs use the CCSDS Orange Book Center Frequency Specification, where the frequency is 191.6+n×0.1 THz and n is an integer ranging from 0 to 33. Here, $Tx_1$ is n=0 to 7, $Tx_2$ is n=8 to 16, $Tx_3$ is n=17 to 24, and $Tx_4$ is n=26 to 33. The wavelength is on the abscissa.

Referring to FIG. 2, optical module 200 may implement communication schemes 300, 310, 400, 410 of FIGS. 3A, 3B, 4A, and 4B, respectively. For instance, relay transmit filter 220 may transmit on bands $Tx_1$ or $Tx_3$ for Type A and on bands $Tx_2$ or $Tx_3$ for Type B. User transmit filter 230 may transmit on band $Tx_4$ for both Type A and Type B. Relay receive filter 240 may receive on bands $Rx_2$ or $Rx_4$ for Type A and on bands $Rx_1$ or $Rx_4$ for Type B. User receive filter 250 may receive on band $Rx_3$ for both Type A and Type B. The wavebands for a given subscript "i", i.e., $Tx_i$ and $Rx_i$, are the same (i.e., i=1, 2, 3, 4).

Figure 5:
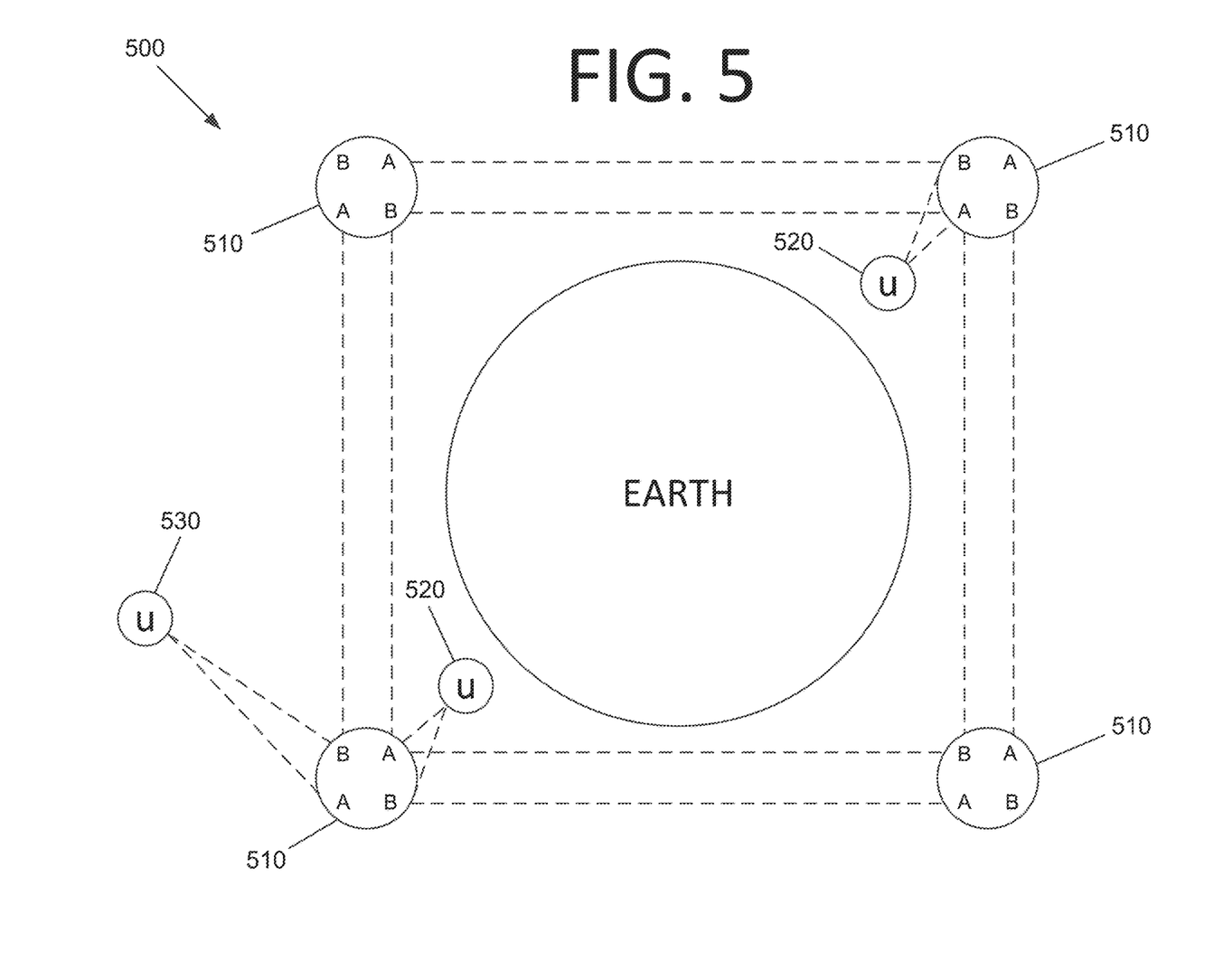
FIG. 5 illustrates a satellite network where each satellite has more than one terminal, according to an embodiment of the present invention.

FIG. 5 illustrates a satellite network 500 where each satellite has more than one terminal, according to an embodiment of the present invention. In this embodiment, relay satellites 510 have antipodal Type A and Type B terminal pairs, i.e., terminal pairs not co-located or adjacent on a spacecraft. However, any desired number and/or types of terminals may be used without deviating from the scope of the invention.

In satellite network 500, relay satellites 510 communicate with opposing terminals of other relay satellites 510 that are in view, i.e., line-of-sight. Each Type A terminal of a relay satellite 510 communicates with a corresponding Type B terminal of another satellite 510, and vice versa. Earth-local user satellites 520 (e.g., low Earth orbit (LEO), medium Earth orbit (MEO), geosynchronous Earth orbit (GEO), geostationary orbit, etc.), or users on Earth, as well as deep space users 530 (e.g., probes, colonies or installations on other planets or bodies, rovers, etc.), can communicate with either terminal type. Advantages of including multiple terminals on relay satellites 510 include, but are not limited to, providing network redundancy, providing a double full dual ring, etc.

Figure 6:
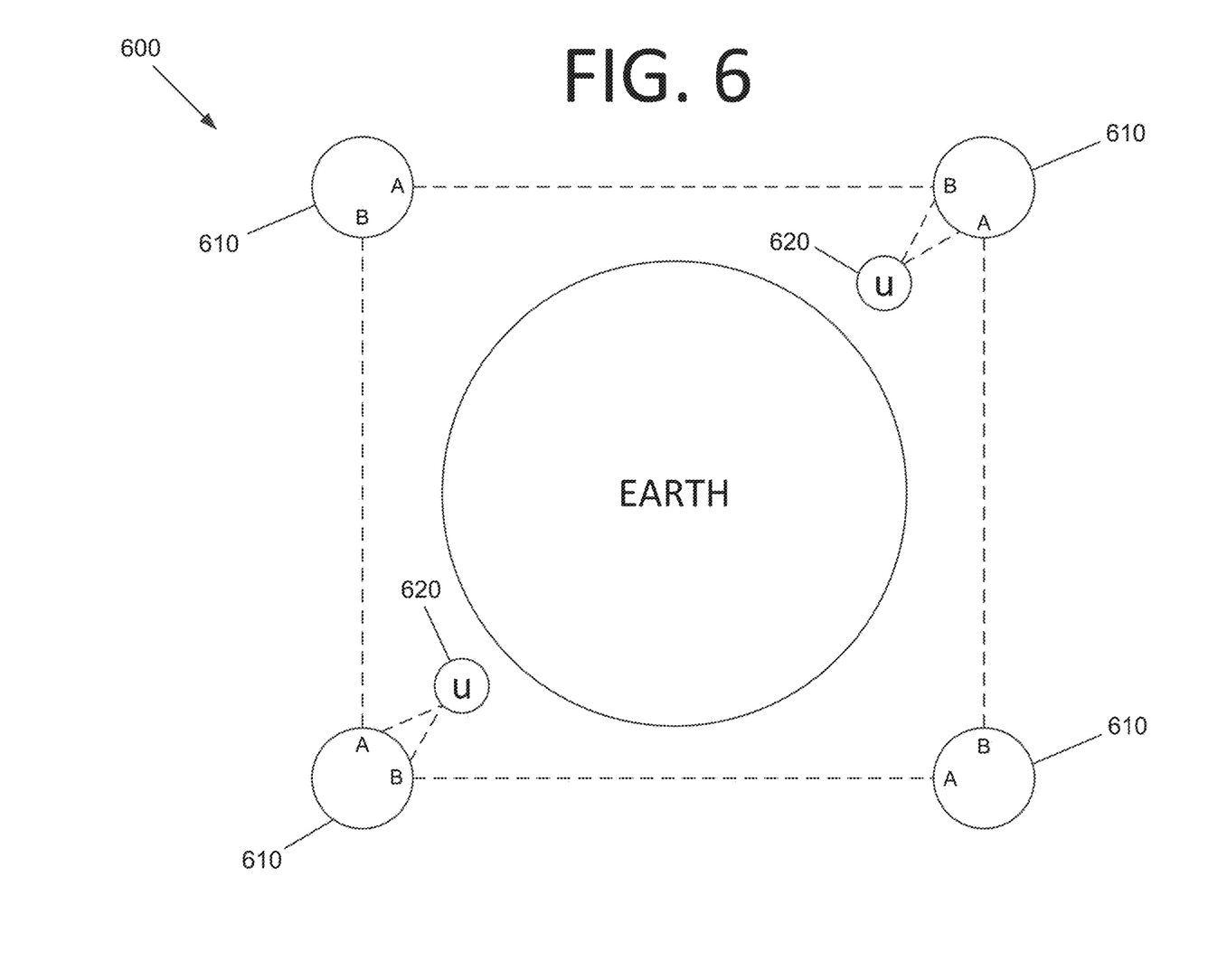
FIG. 6 illustrates a satellite network with a non-dual-ring structure, according to an embodiment of the present invention.

FIG. 6 illustrates a satellite network 600 with a non-dual-ring structure, according to an embodiment of the present invention. In this embodiment, relay satellites 610 only have a single type A and Type B terminal (i.e., one of each). User satellites 620 can communicate with both terminal types, but relay satellites 610 communicate with one another via opposite terminals (i.e., Type A to Type B and vice versa).

Various multi-chroic filter designs are possible for Type A and Type B terminals in some embodiments. A nonlimiting example of a waveband design table is shown below in Table I. D1 is per the communication scheme of FIGS. 3A and 3B and D2 is per the communication scheme of FIGS. 4A and 4B.

TABLE I

WAVEBAND DESIGN TABLE

| Design | Waveband Order (i.e., Wavelength on Abscissa →) | | | | A_TX | B_TX | U_TX | Adjacent Passband Count for A/B |
|---|---|---|---|---|---|---|---|---|
| D1 | 1 | 2 | G | 3 | 4 | PBGPB | BPGPB | BBGBP | 0 |
| D2 | 1 | 3 | 2 | G | 4 | PPBGB | BPPGB | BBBGP | 2 |
| D3 | 1 | G | 2 | 3 | 4 | PGBPB | BGPPB | BGBBP | 1 |
| D4 | 1 | G | 3 | 2 | 4 | PGPBB | BGPPB | BGBBP | 1 |
| D5 | 1 | 2 | 3 | G | 4 | PBGPB | BPPGB | BBBGP | 1 |
| D6 | 1 | 3 | G | 2 | 4 | PPGBB | BPGPB | BBGBP | 1 |

In Table I, "P" stands for Pass (i.e., the transmitter passband is the receiver stopband), "B" stands for Block (i.e., the transmitter stopband is the receiver passband), and "G" stands for Gap (i.e., block). Also, 1 is $Tx_1$ (from a Type A terminal), 2 is $Tx_2$ (from a Type B terminal), 3 is $Tx_3$ (from either a Type A terminal or a Type B terminal to a user terminal), and 4 is $Tx_4$ (from a user terminal). Note that wavebands 1 and 4 are kept fixed in this example.

Table II below shows a nonlimiting example of an extended waveband design table.

TABLE II

EXTENDED WAVEBAND DESIGN TABLE

| Design | Waveband Order (i.e., Wavelength on Abscissa →) | | | | | A_TX | B_TX | U_TX | Adjacent Passband Count for A/B |
|---|---|---|---|---|---|---|---|---|---|
| 4D7 | 1 | 3 | 2 | 4 | G | PPBBG | BPPBG | BBBPG | 2 |
| D2  | 1 | 3 | 2 | G | 4 | PPBGB | BPPGB | BBBGP | 2 |
| D8  | 2 | 3 | 1 | 4 | G | BPPBG | PPBBG | BBBPG | 2 |
| D9  | 2 | 3 | 1 | G | 4 | BPPGB | PPBGB | BBBGP | 2 |
| D10 | 4 | 1 | 3 | 2 | G | BPPBG | BBPPG | BBBGP | 2 |
| D11 | 4 | 2 | 3 | 1 | G | BBPPG | BPPBG | PBBBG | 2 |
| D12 | 4 | G | 1 | 3 | 2 | BGPPB | BGBPP | PGBBB | 2 |
| D13 | 4 | G | 2 | 3 | 1 | BGBPP | BGPPB | PGBBB | 2 |
| D14 | G | 1 | 3 | 2 | 4 | GPPBB | GBPPB | GBBBP | 2 |
| D15 | G | 2 | 3 | 1 | 4 | GPPBB | GPPBB | GBBBP | 2 |
| D16 | G | 4 | 1 | 3 | 2 | GBPPB | GBBPP | GPBBB | 2 |
| D17 | G | 4 | 2 | 3 | 1 | GBBPP | GBPPB | GPBBB | 2 |

For the Table II solutions substantially highlighted in dark gray (i.e., D2, D9, D12, and D13), the Type A and Type B labels can be swapped, and low/high wavelengths can be swapped (left-to-right). Consolidated passbands (e.g., in the D2 design) need not be used in some embodiments. Rather, filter designs for which the adjacency count is zero or one may be allowed.

The adjacency count only applies to the filters for Type A and Type B terminals, and not user terminals. If both Type A and Type B have two adjacent passbands, the adjacency count is two (i.e., both Type A and Type B). Adjacent passbands may make it easier for a multi-layer optical coating to achieve a desired stopband-to-passband rejection ratio or skirt steepness. There are 120 total feasible designs when four bands and a gap are used.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
   at least one user device comprising a user terminal with a plurality of multi-chroic filters, the user terminal comprising a user transmit filter and a user receive filter; and
   two or more relays, each relay comprising at least two terminals having different types from one another, as well as from the user terminal, each relay terminal comprising a relay transmit filter and a relay receive filter, wherein
   said plurality of multi-chroic filters are configured to partition signals from bands into a plurality of sub-bands using a predefined set of transmission and receiving wavelengths; wherein
   transmission from a first relay terminal type to a second relay terminal type is at a center wavelength of $\lambda_1$,
   transmission from the second relay terminal type to the first relay terminal type is at a center wavelength of $\lambda_2$,
   transmission from either the first relay terminal type or the second relay terminal type to a user terminal is at center wavelength of $\lambda_3$, and
   transmission from the user terminal to either the first relay terminal type or the second relay terminal type is at center wavelength of $\lambda_4$.

2. The system of claim 1, wherein each of the two or more relays comprise a Type A terminal and a Type B terminal.

3. The system of claim 1, wherein
   the first relay terminal type is configured to transmit to the second relay terminal type on a first transmission band and to transmit to the user terminal on a third transmission band,
   the first relay terminal type is configured to receive from the second relay terminal type on a second receiving band and to receive from the user terminal on a fourth receiving band,
   the second relay terminal type is configured to transmit to the user terminal on the third transmission band and to receive from the user terminal on the fourth receiving band, and the second relay terminal type is configured to transmit to the first relay terminal type on a second transmission band and to receive from the first relay terminal type on a first receiving band.

4. The system of claim 3, wherein the user does not transmit on the first or second transmission band or receive on the first or second receiving band.

5. The system of claim 3, wherein the user terminal is configured to transmit to both the first relay terminal type and the second relay terminal type on the fourth transmission band and to receive from both the first relay terminal type and the second relay terminal type on the third receiving band.

6. The system of claim 5, wherein the third bands for both transmission and receiving and the second bands for both transmission and receiving are swapped.

7. The system of claim 1, wherein the two or more relays comprise antipodal relay terminal pairs for each relay terminal type to provide network redundancy and a double full duplex ring.

8. The system of claim 1, wherein the multi-chroic filters comprise one or more optical coatings, fiber Bragg gratings (FBGs), prisms, or any combination thereof.

9. A relay, comprising:
a first terminal of a first type comprising a first multi-chroic filter; and
a second terminal of a second type comprising a multi-chroic filter, wherein
said multi-chroic filters of the first terminal and the second terminal are configured to partition signals from bands into a plurality of sub-bands using a predefined set of transmission and receiving wavelengths,
and the first terminal and the second terminal are configured to communicate with other terminals having a second terminal type and a first terminal type, respectively,
transmission from the first terminal type to the second terminal type is at a center wavelength of $\lambda_1$,
transmission from the second terminal type to the first terminal type is at a center wavelength of $\lambda_2$,
transmission from either the first terminal type or the second terminal type to a user terminal is at center wavelength of $\lambda_3$, and
transmission from the user terminal to either the first terminal type or the second terminal type is at center wavelength of $\lambda_4$.

10. The relay of claim 9, wherein the first terminal is a Type A terminal and the second terminal is a Type B terminal.

11. The relay of claim 9, wherein
the first relay terminal type is configured to transmit to the second relay terminal type on a first transmission band and to transmit to a user terminal on a third transmission band,
the first relay terminal type is configured to receive from the second relay terminal type on a second receiving band and to receive from the user terminal on a fourth receiving band, the second relay terminal type is configured to transmit to the user terminal on the third transmission band and to receive from the user terminal on the fourth receiving band, and
the second relay terminal type is configured to transmit to the first relay terminal type on a second transmission band and to receive from the first relay terminal type on a first receiving band.

12. The relay of claim 11, wherein the third bands for both transmission and receiving and the second bands for both transmission and receiving are swapped.

13. The relay of claim 9, wherein the first terminal and the second terminal of the relay are an antipodal relay terminal pair.

14. The relay of claim 9, wherein the multi-chroic filters comprise one or more optical coatings, fiber Bragg gratings (FBGs), prisms, or any combination thereof.

15. A relay, comprising:
a Type A terminal comprising a first multi-chroic filter; and
a Type B terminal comprising a multi-chroic filter, wherein
said multi-chroic filters of the Type A terminal and the Type B terminal are configured to partition signals from bands into a plurality of sub-bands using a predefined set of transmission and receiving wavelengths, and
the Type A terminal and the Type B terminal are configured to communicate with Type B terminals and Type A terminals, respectively,
transmission from the Type A terminal to a Type B terminal of another relay is at a center wavelength of $\lambda_1$,
transmission from the Type B terminal to a Type A terminal of another relay is at a center wavelength of $\lambda_2$,
transmission from either the Type A terminal or the Type B terminal to a user terminal is at center wavelength of $\lambda_3$, and
transmission from the user terminal to either the Type A terminal or the Type B terminal is at center wavelength of $\lambda_4$.

16. The relay of claim 15, wherein
the Type A terminal is configured to transmit to a Type B terminal of another relay on a first transmission band and to transmit to a user terminal on a third transmission band,
the Type A terminal is configured to receive from a Type B terminal of another relay on a second receiving band and to receive from the user terminal on a fourth receiving band,
the Type B terminal is configured to transmit to the user terminal on the third transmission band and to receive from the user terminal on the fourth receiving band, and
the Type B terminal is configured to transmit to a Type A terminal of another relay on a second transmission band and to receive from the Type A terminal of the other relay on a first receiving band.

17. The relay of claim 15, wherein the third bands for both transmission and receiving and the second bands for both transmission and receiving are swapped.

* * * * *